(12) United States Patent
Hansen

(10) Patent No.: US 10,364,677 B2
(45) Date of Patent: Jul. 30, 2019

(54) TURBINE ENGINE HYBRID ROTOR

(71) Applicant: United Technologies Corporation, Hartford, CT (US)

(72) Inventor: James O. Hansen, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 612 days.

(21) Appl. No.: 14/772,192

(22) PCT Filed: Mar. 11, 2014

(86) PCT No.: PCT/US2014/023058
§ 371 (c)(1),
(2) Date: Sep. 2, 2015

(87) PCT Pub. No.: WO2014/150364
PCT Pub. Date: Sep. 25, 2014

(65) Prior Publication Data
US 2016/0017713 A1 Jan. 21, 2016

Related U.S. Application Data

(60) Provisional application No. 61/789,414, filed on Mar. 15, 2013, provisional application No. 61/803,244, filed on Mar. 19, 2013.

(51) Int. Cl.
*F01D 5/02* (2006.01)
*B22F 5/04* (2006.01)
(Continued)

(52) U.S. Cl.
CPC .................. *F01D 5/02* (2013.01); *B22F 5/04* (2013.01); *B22F 7/08* (2013.01); *B23K 20/002* (2013.01);
(Continued)

(58) Field of Classification Search
CPC ... F01D 5/02; F01D 5/282; F01D 5/30; F01D 5/34; B22F 5/04; B22F 7/08;
(Continued)

(56) References Cited

U.S. PATENT DOCUMENTS 3,905,723 A 9/1975 Torti, Jr.
4,011,295 A 3/1977 Tree et al.
(Continued)

OTHER PUBLICATIONS

Huang et al., In situ TiBw/Ti-6Al-4V composites with novel reinforcement architecture fabricated by reaction hot pressing, Feb. 20, 2009, Science Direct.*
(Continued)

*Primary Examiner* — Laert Dounis
*Assistant Examiner* — Kelsey L Stanek
(74) *Attorney, Agent, or Firm* — Bachman & LaPointe, P.C.

(57) ABSTRACT

A turbine engine rotor component has a Ti-based first member (66) circumscribing an axis (500) and has either a circumferential array of integrally formed airfoils (62) or a circumferential array of blade retention features. A TiB particulate reinforced second member (90) also circumscribes the axis.

20 Claims, 3 Drawing Sheets

(51) Int. Cl.
*C22C 14/00* (2006.01)
*F01D 5/34* (2006.01)
*B22F 7/08* (2006.01)
*C22C 1/04* (2006.01)
*B23K 20/00* (2006.01)
*B23K 20/02* (2006.01)
*B23K 31/02* (2006.01)
*F01D 5/28* (2006.01)
*F01D 5/30* (2006.01)
*F01D 25/24* (2006.01)
*C22C 32/00* (2006.01)

(52) U.S. Cl.
CPC .............. *B23K 20/02* (2013.01); *B23K 31/02* (2013.01); *C22C 1/0458* (2013.01); *C22C 14/00* (2013.01); *C22C 32/0073* (2013.01); *F01D 5/282* (2013.01); *F01D 5/30* (2013.01); *F01D 5/34* (2013.01); *F01D 25/24* (2013.01); *F05D 2220/32* (2013.01); *F05D 2240/20* (2013.01); *F05D 2300/133* (2013.01); *F05D 2300/174* (2013.01); *F05D 2300/603* (2013.01); *F05D 2300/702* (2013.01)

(58) Field of Classification Search
CPC ...... B23K 20/002; B23K 20/02; B23K 31/02; C22C 1/0458; C22C 32/0073; C22C 14/00; F05D 2220/32; F05D 2240/20; F05D 2300/133; F05D 2300/174; F05D 2300/603; F05D 2300/702
USPC ........... 415/220; 416/204 A, 241 R; 228/193
See application file for complete search history.

(56) References Cited

U.S. PATENT DOCUMENTS

| | | | |
|---|---|---|---|
| 4,479,293 A | 10/1984 | Miller et al. | |
| 5,305,520 A | 4/1994 | Doorbar et al. | |
| 5,363,554 A | 11/1994 | Partridge et al. | |
| 5,470,524 A | 11/1995 | Krueger et al. | |
| 5,511,604 A | 4/1996 | Ravenhall et al. | |
| 6,551,372 B1* | 4/2003 | Ewing | C22C 1/0433 419/28 |
| 6,939,508 B2 | 9/2005 | Bampton et al. | |
| 7,531,021 B2* | 5/2009 | Woodfield | C22C 1/1031 75/232 |
| 7,726,023 B2 | 6/2010 | Pursell | |
| 7,811,062 B1 | 10/2010 | Twigg | |
| 8,123,486 B2 | 2/2012 | Carrier et al. | |
| 2008/0253887 A1 | 10/2008 | Cairo et al. | |
| 2012/0006452 A1* | 1/2012 | Mitchell | C22C 1/023 148/671 |
| 2012/0156044 A1* | 6/2012 | Ortiz | F01D 5/34 416/213 R |
| 2012/0301307 A1 | 11/2012 | Yang et al. | |
| 2013/0004313 A1* | 1/2013 | El-Aini | F01D 5/10 416/134 R |
| 2013/0209260 A1* | 8/2013 | Stone | F01D 5/027 416/205 |
| 2014/0294594 A1* | 10/2014 | Spoonire | F04D 29/324 416/230 |

OTHER PUBLICATIONS

European Search Report for EP Patent Application No. 14769241.2, dated Oct. 25, 2016.
K.S. Ravi Chandran et al., "TiBw-Reinforced Ti Composites: Processing, Properties, Application Prospects, and Research Needs", JOM: The Journal of the Minerals, Metals & Materials Society, May 2004, The Minerals, Metals & Materials Society, Warrendale, PA.
International Search Report and Written Opinion for PCT/US2014/023058, dated Aug. 25, 2014.
European Office action dated Dec. 19, 2018 for EP Patent Application No. 14769241.2.

* cited by examiner

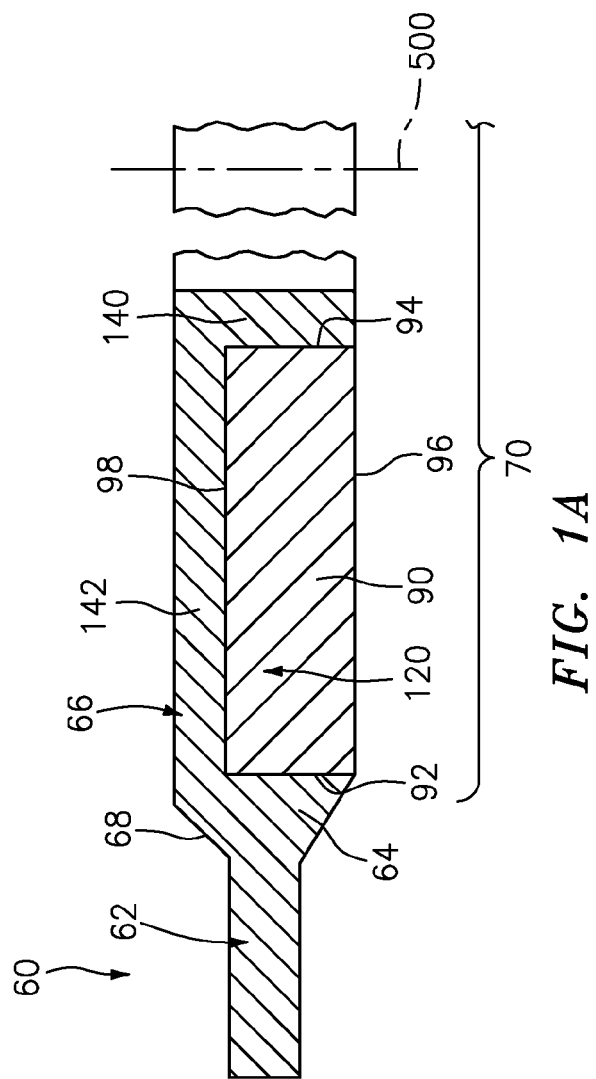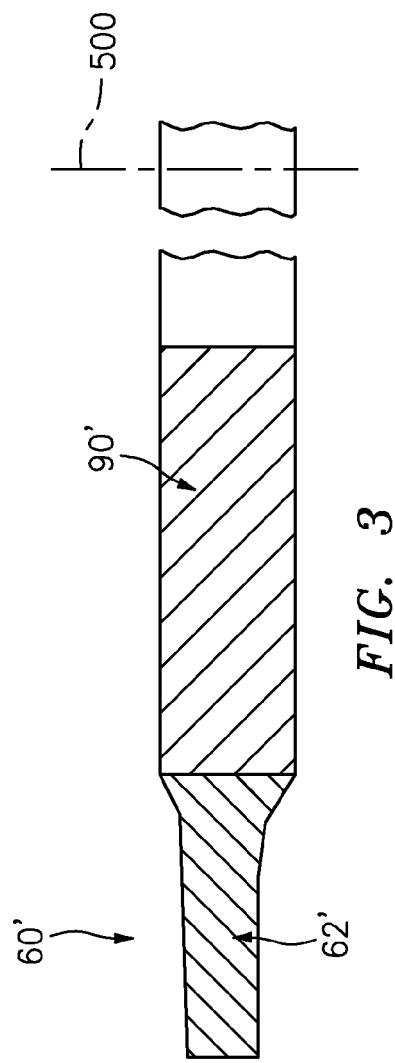

TABLE I ALLOY PROPERTIES

| Alloy | Room Temperature (28°C) | | | 1000°F (538°C) | | Density (lb/in3 (g/cm3)) | Directionality |
|---|---|---|---|---|---|---|---|
| | YS (ksi (GPa)) | UTS (ksi (GPa)) | Modulus of elasticity (Msi (GPa)) | YS (ksi (GPa)) | UTS (ksi (GPa)) | | |
| Wrought Ti 6-4 | 135 (0.93) | 150 (1.03) | 16 (1.1x10²) | 65 (0.45) | 82 (0.57) | 0.160 (4.43) | Isotropic |
| Wrought Alloy C | 130 (0.90) | 145 (1.00) | 16 (1.1x10²) | 99 (0.68) | 125 (0.86) | 0.193 (5.34) | Isotropic |
| Wrought Alloy C+ | 165 (1.14) | 178 (1.23) | 16 (1.1x10²) | 128 (0.88) | 147 (1.01) | 0.193 (5.34) | Isotropic |
| Wrought Ti 5-5-5-3 | 170 (1.17) | 180 (1.24) | 16 (1.1x10²) | – | – | 0.163 (4.51) | Isotropic |
| Ti 6-4 + TiB | 160 (1.10) | 175 (1.21) | 20 (1.4x10²) | 100 (0.69) | 115 (0.79) | 0.160 (4.43) | Isotropic |
| Ti Alloy C + TiB (estimated) | 165 (1.14) | 175 (1.21) | 20 (1.4x10²) | 130 (0.90) | 165 (1.14) | 0.193 (5.34) | Isotropic |
| Ti Alloy C+ + TiB (estimated) | 205 (1.41) | 220 (1.52) | 20 (1.4x10²) | 170 (1.17) | 200 (1.38) | 0.193 (5.34) | Isotropic |
| Ti 5-5-5-3 + TiB | 210 (1.45) | 230 (1.59) | 20 (1.4x10²) | | | | Isotropic |
| Ti MMC (Ti 6-4/SiC 35V%) | | 245 (1.69) (long.) | 29 (2.0x10²) | | | 0.142 (3.93) | Anisotropic |

*FIG. 2*

TURBINE ENGINE HYBRID ROTOR

CROSS-REFERENCE TO RELATED APPLICATIONS

Benefit is claimed of U.S. Patent Application Ser. No. 61/789,414, filed Mar. 15, 2013, and entitled "Turbine Engine Hybrid Rotor" and U.S. Patent Application Ser. No. 61/803,244, filed Mar. 19, 2013, and entitled "Turbine Engine Hybrid Rotor", the disclosures of which are incorporated by reference herein in their entireties as if set forth at length.

BACKGROUND

The disclosure relates to gas turbine engines. More particularly, the disclosure relates to rotors.

The disclosure relates to gas turbine engines. More particularly, the disclosure relates to rotors.

Turbine engine rotors include disk or ring components (collectively "disks") that either: (1) have blade retention features that hold separately-formed blades (e.g., secured via convoluted "fir tree" blade roots and complementary disk slots) or (2) are formed integrally with the blade airfoils (so-called integrally bladed rotors (IBRs) or BLISKs or BLINGs).

In axial compressors, the disks are often formed of a high strength titanium alloy. The rotor may include a stack of such disks. They may be formed as integrally bladed rotors or as disks having a circumferential array of features such as fir tree or dovetail slots for receiving complementary blade roots.

In operation, as the rotor stack rotates, inertial forces stress the rotor stack. The rotation-induced tensile forces increase with radius. Exemplary engine speeds are 5,000-20,000 rpm for smaller engines and 10,000-30,000 rpm for larger engines. At high engine speeds, the inertial forces on outboard portions of a simple annular ring component could produce tensile forces in excess of the material strength of the component. It is for this reason that disk "bores" are ubiquitous in the art. The bore is a radially inboard protuberant annulus, coupled to the outer band (and thus such a "bore" is not to be confused with the central aperture of the disk which such bore typically bounds). The outer band carries or is integrally formed with the blade airfoils. A generally annular web extends radially outward from the bore to the band.

As noted above, the bore typically encircles a central aperture of the disk. A portion of a shaft may freely pass through the bore with clearance. The shaft may be of the same spool as the disk (e.g., in a center-tie rotor) or of a different spool.

By placing a large amount of material relatively inboard (and therefore subject to subcritical stress levels) some of the supercritical stress otherwise imposed on outboard portions of the disk may be transferred to the bore via the web. Thus, the disk with bore may be able to withstand a greater rotational speed than without.

Additionally, there may be hoop strength reinforcements for the outer band. Some of these may be sufficient to allow elimination of the bore. Numerous companies have explored the use of continuous fiber titanium metal matrix composites. See, e.g., U.S. Pat. No. 5,470,524. Ti MMC IBRs can save >25% in weight over conventional monolithic IBRs, largely by eliminating the bore. The drawbacks with continuous fiber MMC systems are related to the very high cost of the fiber, the labor intensive TMC fabrication process, and the non-isotropic properties of the MMC ring (which can lead to high levels of residual stress).

Separately, there has been work with powder metallurgy titanium with boron, carbon and silicon additions which results in a very fine TiB, TiC or $TiSi_2$ precipitates that can increase strengths by 25-50% and modulus by 25%. Most of this work has been with Ti 6-4 (Ti-6 Al-4 V which is 6% Al and 4% V, by weight). Crucible Corp. has been making powder and FMW Composites Inc. has been doing the downstream processing. One particular example is shown in U.S. Pat. No. 7,531,021, the disclosure which is incorporated by reference in its entirety herein as is set forth at length. The precipitants form a discontinous reinforcement and, at least in the case of TiB referred to as whiskers, all with the notation $TiB_W$. This is included in the use of the more simple term TiB below.

Recently, there has been work with higher strength titanium alloys. Strengths as high as 230 ksi (1.59 GPa) have been demonstrated with TiB reinforces Ti 5-5-5-3 (Ti-5 Al-5 V-5 Mo-3 Cr). This level of strength is similar to strengths demonstrated in conventional Ti MMCs. Other high strength and high temperature alloys (Ti 6-2-4-6, Ti 6-2-4-2, Alloy C+, and the like) could use a similar approach to produce very high strengths. Table I of FIG. 2 has physical properties of several conventional wrought alloys and TiB particulate-reinforced versions of the same alloys. Conventional long fiber Ti MMC properties are included for comparison. In the table, English units are the originals and metric units are calculated conversions.

SUMMARY

One aspect of the disclosure involves a turbine engine rotor component having a Ti-based first member circumscribing an axis and having either a circumferential array of integrally-formed airfoils or a circumferential array of blade retention features. A TiB particulate-reinforced second member also circumscribes the axis.

In additional or alternative embodiments of any of the foregoing embodiments, the TiB particulate-reinforced second member is a TiB particulate-reinforced second member.

In additional or alternative embodiments of any of the foregoing embodiments, the second member is diffusion bonded to the first member.

In additional or alternative embodiments of any of the foregoing embodiments, at 28° C. one to all of: the second member has higher yield tensile strength than the first member; the second member has higher ultimate tensile strength than the first member; the second member has higher modulus than the first member; the first member is more machinable than the second member; and the first member has higher fatigue strength than the second member.

In additional or alternative embodiments of any of the foregoing embodiments, the second member is a powder-metallurgical member.

In additional or alternative embodiments of any of the foregoing embodiments, the first member is a non-powder-metallurgical member.

In additional or alternative embodiments of any of the foregoing embodiments, the first member and second member each account for at least 20% of weight of the turbine engine rotor component.

In additional or alternative embodiments of any of the foregoing embodiments, one or both of: the second member has higher boron content than the first member; and the second member has higher TiB than the first member.

In additional or alternative embodiments of any of the foregoing embodiments, one to all of: the first member has a boron content of less than 0.1% by weight; the first member has a 28° C. ultimate tensile strength of less than 1.25 GPa; the second member has a boron content of at least 0.5% by weight; and the second member has a 28° C. ultimate tensile strength of more than 1.38 GPa.

In additional or alternative embodiments of any of the foregoing embodiments, one to all of: the first member has a boron content of less than 0.05% by weight; the first member has a 28° C. ultimate tensile strength of less than 1.10 GPa; the second member has a boron content of 0.5-2.0% by weight; and the second member has a 28° C. ultimate tensile strength of more than 1.17 GPa.

In additional or alternative embodiments of any of the foregoing embodiments, in axial cross-section: the first member has a pocket open either one or more of inboard, outboard, fore, and aft; and the second member is accommodated in the pocket.

In additional or alternative embodiments of any of the foregoing embodiments, the component lacks a protuberant bore.

In additional or alternative embodiments of any of the foregoing embodiments, the method comprises: forming the first member; forming the second member; and securing the second member to the first member.

In additional or alternative embodiments of any of the foregoing embodiments, the securing comprises diffusion bonding.

In additional or alternative embodiments of any of the foregoing embodiments, the forming of the first member comprises a non-powder-metallurgical technique and the forming of the second member comprises a powder-metallurgical technique.

In additional or alternative embodiments of any of the foregoing embodiments, an engine comprises: an engine case; and the component, wherein component is a compressor component.

In additional or alternative embodiments of any of the foregoing embodiments, the component is an integrally-bladed ring.

In additional or alternative embodiments of any of the foregoing embodiments, the second member is accommodated in a pocket of the first member and is partially exposed.

Another aspect of the disclosure involves a turbine engine rotor component comprising a TiB particulate-reinforced first member circumscribing an axis and a circumferential array of airfoils bonded to the first member.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 1A is an enlarged view of a blade ring of the engine of FIG. 1.

FIG. 2 is a table of properties of various materials.

FIG. 3 is an enlarged sectional view of an alternate blade ring.

Like reference numbers and designations in the various drawings indicate like elements.

DETAILED DESCRIPTION

Figure 1:
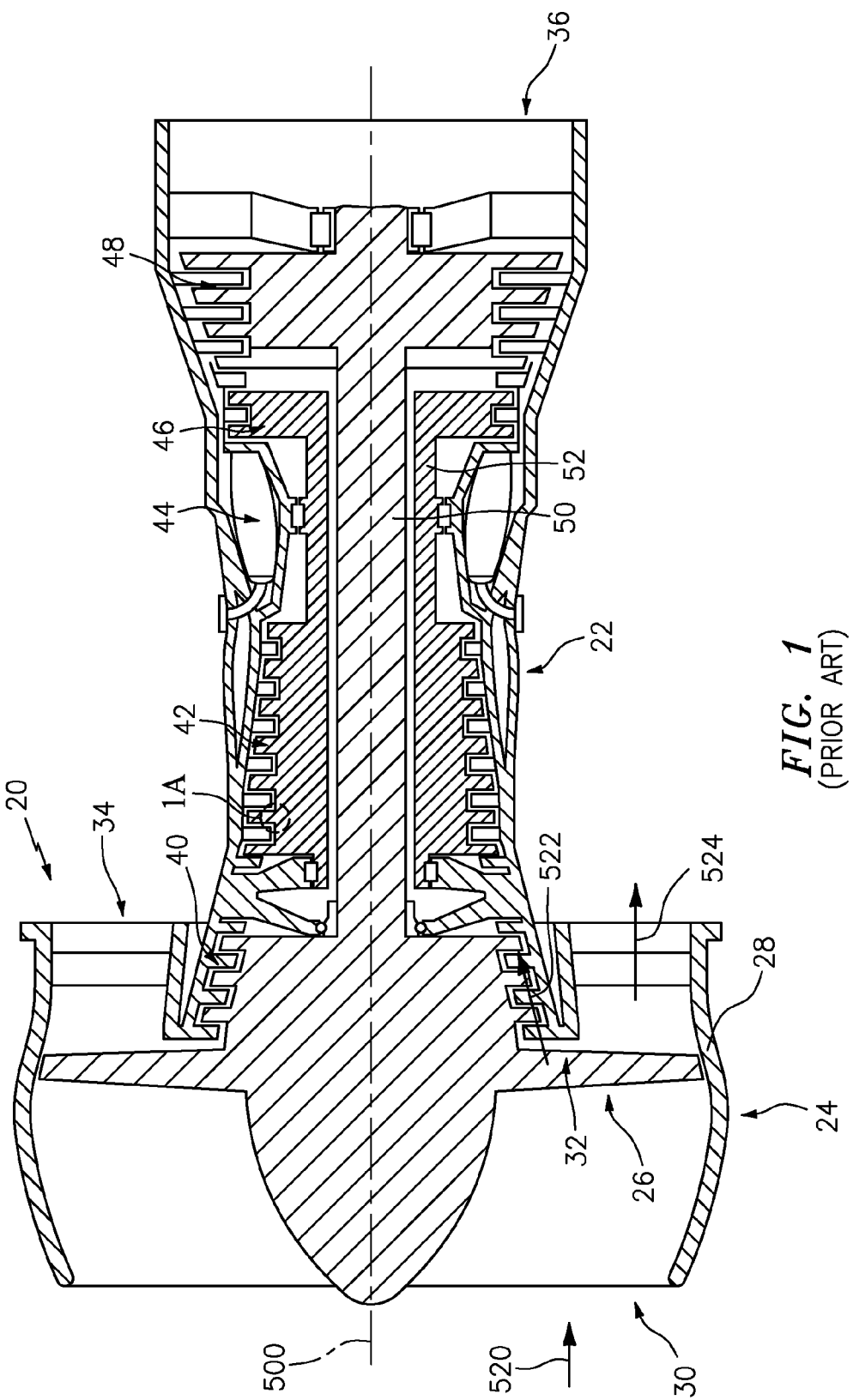
FIG. 1 is a partially schematic longitudinal sectional view of a gas turbine engine.

FIG. 1 shows a gas turbine engine. FIG. 1 shows a gas turbine engine 20 having an engine case 22 surrounding a centerline or central longitudinal axis 500. An exemplary gas turbine engine is a turbofan engine having a fan section 24 including a fan 26 within a fan case 28. The exemplary engine includes an inlet 30 at an upstream end of the fan case receiving an inlet flow along an inlet flowpath 520. The fan 26 has one or more stages of fan blades 32. Downstream of the fan blades, the flowpath 520 splits into an inboard portion 522 being a core flowpath and passing through a core of the engine and an outboard portion 524 being a bypass flowpath exiting an outlet 34 of the fan case.

The core flowpath 522 proceeds downstream to an engine outlet 36 through one or more compressor sections, a combustor, and one or more turbine sections. The exemplary engine has two axial compressor sections and two axial turbine sections, although other configurations are equally applicable. From upstream to downstream there is a low pressure compressor section (LPC) 40, a high pressure compressor section (HPC) 42, a combustor section 44, a high pressure turbine section (HPT) 46, and a low pressure turbine section (LPT) 48. Each of the LPC, HPC, HPT, and LPT comprises one or more stages of blades which may be interspersed with one or more stages of stator vanes.

In the exemplary engine, the blade stages of the LPC and LPT are part of a low pressure spool mounted for rotation about the axis 500. The exemplary low pressure spool includes a shaft (low pressure shaft) 50 which couples the blade stages of the LPT to those of the LPC and allows the LPT to drive rotation of the LPC. In the exemplary engine, the shaft 50 also directly drives the fan. In alternative implementations, the fan may be driven via a transmission (e.g., a fan gear drive system such as an epicyclic transmission) to allow the fan to rotate at a lower speed than the low pressure shaft.

The exemplary engine further includes a high pressure shaft 52 mounted for rotation about the axis 500 and coupling the blade stages of the HPT to those of the HPC to allow the HPT to drive rotation of the HPC. In the combustor 44, fuel is introduced to compressed air from the HPC and combusted to produce a high pressure gas which, in turn, is expanded in the turbine sections to extract energy and drive rotation of the respective turbine sections and their associated compressor sections (to provide the compressed air to the combustor) and fan.

FIG. 1A shows a compressor blade stage 60 of a rotor of the engine of FIG. 1. The exemplary blade stage is an integrally bladed stage wherein the blade airfoils 62 are integrally formed as a single piece including a rim, band, or ring portion 64 of a first member 66 circumscribing the engine axis. The first member includes a radially outboard surface 68 (locally forming an inboard boundary of the core gaspath) from which the airfoils protrude. The exemplary first member is formed of a Ti alloy. More particularly, it is formed of a relatively inexpensive conventional wrought Ti-based alloy. The portion of the first member 66 inboard of the airfoil 62 combines with a second member to form a disk 70.

FIG. 1A further shows the second member 90 mounted/joined to the first member. The exemplary second member is a full-annulus ring 90 of a powder metallurgical (PM) Ti-based alloy. Utilizing a very high strength (e.g., >200 ksi) TiB particulate-reinforced ring 90 in place of a Ti MMC ring can save similar weight without the cost and anisotropic properties found with conventional Ti-MMCs. The ring could be diffusion bonded or forge joined to the first ring. The conventional and particulate reinforced materials could also be co-extruded or hot isostatically pressed to join them. Similarly, conventional airfoils could be diffusion bonded or linear friction welded to the second ring without a first ring (FIG. 3). Additive manufacturing techniques can also be used to create conventional airfoils on a particulate-reinforced ring. The first ring 64 may have good HCF or temperature capability. Fabrication methods for the first ring and the mating of the second ring may be similar for those used to join continuous fiber MMC rings. However, due to the isotropic thermal expansion of particulate-reinforced ring, other joining methods are also applicable.

Viewed in axial cross-section, the second ring is formed as an axially-elongate rectangle, having an outboard surface 92, an inboard surface 94, a forward/front/upstream surface 96 and a rear/back/aft surface 98.

FIG. 2 (Table I) shows properties of various candidate materials for the first ring, second ring, and prior art MMC second ring. The exemplary second ring is a TiB particulate-reinforced titanium member.

Thus, for example a conventional Ti-6-4 first member may offer low cost. The addition of a high strength, high modulus PM second member may provide higher performance than in the absence of the second member at less cost than other high performance options such as fiber-reinforcement (continuous fiber MMC). Thus, one group of examples involves using one of the lower yield strength wrought alloys (rather than one of the higher yield strength wrought alloys) for the first member and one of the higher yield strength TiB particulate-reinforced alloys for the second member. These higher strength TiB particulate-reinforced alloys may have room temperature isotropic UTS nearly as high (e.g., within about 20%, more narrowly, within about 15%) of the corresponding longitudinal UTS of the anisotropic long fiber Ti MMC. Thus, exemplary room temperature (20° C. or 28° C.) UTS of the second member may be at least 1.35 GPa (more narrowly, at least 1.45 GPa) while room temperature UTS of the first member may be less than 1.25 GPa (more narrowly, less than 1.15 GPa) for such exemplary combinations of relatively low strength wrought alloys and relatively high strength TiB particulate-reinforced.

The exemplary second member is at least partially accommodated in a compartment 120 of the first member. The exemplary compartment is forwardly open and closed inboard by an inner rim section 140. In the exemplary embodiment, the inner rim section 140 is joined to the outer rim portion 64 by a radial web 142. This illustration is merely illustrative and schematic. Particularly, the first member would be expected to have complex surface geometry including things such as features for engaging seals, features for engaging other rings, features for engaging tie rods, and the like.

An exemplary manufacture sequence includes forming the first member by forging and machining (or other conventional process, more particularly in some embodiments a non-powder metallurgical process).

An exemplary manufacture sequence includes forming the second member by extruding, forging to form a large pancake, and then machining out an annular ring. An alternative involves a hot isostatic pressing (HIP) of a powder compact and machining. Another alternative involves extruding a powder compact (absent forging) and machining. Other alternatives involve HIP followed by forging.

An exemplary manufacture sequence includes joining the second member to the first member by forge joining.

Alternatives involve diffusion bonding, HIP bonding, co-extrusion, or linear friction welding.

FIG. 3 shows an alternate blade stage 60' wherein a series of individual blades 62' are secured to a TiB particulate reinforced member 90'. The exemplary member 90' substantially forms the disk alone (e.g., without a continuation of the unreinforced metal of the blades extending radially inboard). Exemplary airfoil securing includes friction welding, forge joining, coextrusion (e.g., followed by machining to further refine the airfoils and disk contours), diffusion bonding, hot isostatic pressing (HIP) bonding, and additive manufacturing (e.g., laser, electron beam, gas tungsten arc (GTA), and the like).

One or more embodiments have been described. Nevertheless, it will be understood that various modifications may be made. For example, when implemented as a modification of a baseline engine configuration, details of the baseline may influence details of any particular implementation.

Accordingly, other embodiments are within the scope of the following claims.

What is claimed is:

1. A turbine engine rotor component comprising:
   a Ti-based first member (6) circumscribing an axis (500) and having either a circumferential array of integrally-formed airfoils (62) or a circumferential array of blade retention features; and
   a $TiB_w$ particulate-reinforced second member (90) circumscribing the axis.

2. The component of claim 1 wherein:
   the second member is diffusion bonded to the first member.

3. The component of claim 1 wherein at 28° C. one to all of:
   the second member has higher yield tensile strength than the first member;
   the second member has higher ultimate tensile strength than the first member;
   the second member has higher modulus than the first member;
   the first member is more machinable than the second member; and
   the first member has higher fatigue strength than the second member.

4. The component of claim 3 wherein:
   the second member is a powder-metallurgical member.

5. The component of claim 4 wherein:
   the first member is a non-powder-metallurgical member.

6. The component of claim 5 wherein:
   the first member and the second member each account for at least 20% of weight of the turbine engine rotor component.

7. The component of claim 1 wherein one or both of:
   the second member has higher boron content than the first member; and
   the second member has higher TiB than the first member.

8. The component of claim 1 wherein in axial cross-section:
   the first member has a pocket (120) open either one or more of inboard, outboard, fore, and aft; and
   the second member is accommodated in the pocket.

9. The component of claim 1 wherein:
   the component lacks a protuberant bore.

10. A method for manufacturing the component of claim 1, the method comprising:
    forming the first member;
    forming the second member; and
    securing the second member to the first member.

11. The method of claim 10 wherein the securing comprises diffusion bonding.

12. The method of claim 11 wherein:
the forming of the first member comprises a non-powder-metallurgical technique; and
the forming of the second member comprises a powder-metallurgical technique.

13. A turbine engine rotor component comprising:
a Ti-based first member (66) circumscribing an axis (500) and having either a circumferential array of integrally-formed airfoils (62) or a circumferential array of blade retention features; and
a TiB particulate-reinforced second member (90) circumscribing the axis, wherein one to all of:
the first member has a boron content of less than 0.1% by weight;
the first member has a 28° C. ultimate tensile strength of less than 1.25 GPa;
the second member has a boron content of at least 0.5% by weight; and
the second member has a 28° C. ultimate tensile strength of more than 1.38 GPa.

14. The component of claim 13 wherein one to all of:
the first member has a boron content of less than 0.05% by weight;
the first member has a 28° C. ultimate tensile strength of less than 1.10 GPa;
the second member has a boron content of 0.5-2.0% by weight; and
the second member has a 28° C. ultimate tensile strength of more than 1.17 GPa.

15. A turbine engine (20) comprising:
an engine case (22); and
a compressor component comprising:
 a Ti-based first member (66) circumscribing an axis (500) and having either a circumferential array of integrally-formed airfoils (62) or a circumferential array of blade retention features; and
 a TiB particulate-reinforced second member (90) circumscribing the axis.

16. The turbine engine of claim 15 wherein:
the compressor component is an integrally-bladed ring.

17. The turbine engine of claim 15 wherein:
the second member is accommodated in a pocket (120) of the first member and is partially exposed.

18. The turbine engine of claim 15 wherein:
the second member is diffusion bonded to the first member.

19. A turbine engine rotor component comprising:
a Ti-based first member (66) circumscribing an axis (500) and having either a circumferential array of integrally-formed airfoils (62) or a circumferential array of blade retention features; and
a TiB particulate-reinforced second member (90) circumscribing the axis, wherein in axial cross-section:
the first member has a pocket (120) open one of fore and aft and closed inboard and outboard; and
the second member is accommodated in the pocket.

20. A turbine engine rotor component comprising:
a Ti-based first member (66) circumscribing an axis (500) and having either a circumferential array of integrally-formed airfoils (62) or a circumferential array of blade retention features; and
a TiB particulate-reinforced second member (90) circumscribing the axis, wherein:
the first member and the second member each account for at least 20% of weight of the turbine engine rotor component; and
at 28° C. one to all of:
 the second member has higher yield tensile strength than the first member;
 the second member has higher ultimate tensile strength than the first member;
 the second member has higher modulus than the first member;
 the first member is more machinable than the second member; and
the first member has higher fatigue strength than the second member.

* * * * *